3,284,216
FIRE-RETARDANT COATING COMPOSITION
Benjamin B. Kaplan, West Hartford, Conn., assignor to Albi Manufacturing Company, Inc., Rockville, Conn., a corporation of Connecticut
No Drawing. Filed Nov. 8, 1965, Ser. No. 506,885
14 Claims. (Cl. 106—16)

This application is a continuation-in-part of my copending application Serial No. 244,916, filed December 17, 1962, now abandoned, which in turn was a continuation-in-part of application Serial No. 109,815 filed May 15, 1961, now abandoned.

This invention relates to a composition resistant to fire and to heat and pertains more specifically to an improved coating composition adapted to coat and protect a substrate against the effects of high temperatures and flames.

Intumescent fire-retardent and heat-retardent paints are well known to the art, usually consisting of a film-forming material, a carbonaceous material, and a spumific agent along with other optional ingredients.

Such compositions, when coated on a surface to be protected such as wood, steel, synthetic plastic, etc., and dried, function by puffing up when exposed to elevated temperatures to protect the substrate against the effect of the high temperature for a substantial period of time.

One object of the present invention is to provide an intumescent paint of improved effectiveness and durability.

Another object is to provide a fire-retardant, heat-resistant composition adapted to coat a variety of substrates including not only wood and metal, but also a variety of synthetic plastic compositions, and to provide protection of a high order for the substrate against flames and elevated temperatures.

Still a further object is to provide a fire-retardant heat-resistant composition containing an inorganic fibrous material distributed throughout its mass and having a very high resistance to heat.

Another object is to provide a liquid coating composition containing inorganic fibers which can readily be sprayed with conventional equipment to form a fire-retardant and heat-resistant coating of unusual durability and effectiveness.

Another object is to provide a composition giving effective protection over a very wide range of temperatures, from as low as 125° C. or even lower to as high as 900° C. or more.

Other and further objects will be apparent from the description which follows.

It has been found that the durability and effectiveness of intumescent paints can be greatly improved by incorporating therein a mass of glass fibers, which are generally from one-tenth inch to as much as six inches or more in length, those from one-quarter to one inch in length being preferred as giving optimum results with optimum appearance of the painted surface. The individual fibers may be dispersed in discrete form or as a randomly oriented mass throughout the mass of the composition or yarns of about the same length composed of several individual fibers may be dispersed in the composition. A variety of commercially available glass fibers may be employed; excellent results have been obtained with those having a fiber diameter of 3 to 5 microns (Superglas 1000 and Superglas 1500) which are readily wetted with aqueous solutions and which do not absorb liquids. Glass fibers having larger diameters, up to 100 to 200 microns or even more, may also be used. Glass fibers precoated with a vinyl resin such as polyvinyl chloride or the like (Fiberglas screen yarn) in order to facilitate their dispersion in the composition and to ensure that the composition be readily sprayable in conventional spray equipment may also be used. The amount of vinyl resin coating on the fibers may range upwardly of 100% by weight of the inorganic portion.

The glass fibers may be used in amounts (not including the weight of any coating on the fibers) ranging up to about 30% by weight of the remainder of the composition, including solvents, without seriously impeding the spraying characteristics of the mix. Even higher proportions of fibers may be employed if specially designed spray equipment is available or if the composition is applied to the surface to be protected by some other method, as for example by trowelling. When the inorganic fiber (exclusive of any fiber coating) amounts to less than about 2% of the weight of the remainder of the composition, it has little effect on the properties of the composition. Optimum effectiveness is obtained with compositions in which the bare fiber amounts to 8% to 25% by weight of the remainder of the composition, including solvents. Asbestos fibers are not equivalent to glass fibers in the present invention and do not, by themselves, produce the improved results of the present invention. However, a limited quantity of asbestos fibers, as well as of other inorganic fillers such as clay, may be present in addition to glass fibers; in some cases their presence may be desirable to provide for optimum spraying characteristics of the paint. As the amount of asbestos fibers present is increased they have a deleterious effect which tends to cancel out the beneficial effect of the glass fibers. In general, the amount of conventional asbestos fibers or of other inorganic fillers should not exceed about 80% by weight of the glass fibers present (exclusive of the weight of any coating on the fibers) for best results.

After drying by evaporation of the volatile solvents, the bare weight of the glass fibers amounts to about 16% to 50% by weight of the remainder of the composition (i.e., of the remaining solids content), preferably 30% to 40% by weight.

Any of the known intumescent paints are greatly improved by the incoporation therein of a mass of glass fibers. Among such paints are those described in United States Patents 2,452,054; 2,452,055; 2,523,626; 2,628,946; 2,702,283; 2,917,476; 2,956,037; 2,984,640; and 3,037,951. In general, such intumescent paints include a volatile liquid vehicle or carrier in which the remaining ingredients are dissolved or dispersed and which evaporate as the paint dries, a film-forming material or binder, preferably a synthetic resinous binder, which serves to bond the remaining ingredients to each other and to the surface of the substrate when the paint is dry, and one or more spumific agents which react, upon heating to an elevated temperature of the order of 125° to 400° C. or even higher, with each other or with the binder or with some product evolved by heat-decomposition from the binder to cause the mass of the dried paint layer to puff or swell up into a foam-like mass at least four times as thick as the original dried paint layer. The binder may be present as a preformed material or in the form of two or more separate ingredients which react with each other to form a resinous binder as the paint dries, such as a mixture of urea or thiourea or dicyandiamide or melamine with an aliphatic aldehyde (or source of aldehyde) such as formaldehyde or paraformaldehyde or trioxymethylene (or hexamethylene tetramine) or acetaldehyde or furfural. Other binders which may be used either alone or in combination with the foregoing include drying oils; alkyd resins; cellulose derivatives such as esters or ethers, e.g., cellulose acetate or butyrate, ethyl cellulose, or hydroxyethyl cellulose; sodium carboxymethyl cellulose; starch; a chlorine-containing organic polymer such as chlorinated rubber, rubber hydrochloride, polymers and copolymers of vinyl choride or of vinyllidene chloride, e.g., polyvinyl chloride, copolymers of vinyl chloride with vinyl acetate, polyvinylidene chloride, copolymers of vinylidene chloride with vinyl chloride or vinyl acetate, polychloroprene; epoxy resins; and other similar materials. The spumific agent may be dicyandiamide or melamine pyrophosphate, mono- or di-ammonium phosphate, phosphoric acid, guanyl urea phosphate, ammonium sulfate, sulfamic acid, ammonium sulfamate, ammonium bromide, sodium tungstate boric acid, sodium borate, polyphosphorylamide, and water-insoluble metaphosphates such as those of sodium, potassium, calcium, or zinc. Melamine pyrophosphate, dicyandimide, and polyphosphorylamide are particularly preferred.

The volatile liquid vehicle or carrier may be water or an organic liquid such as a hydrocarbon, alcohol, ketone, ether, chlorinated hydrocarbon, etc. The precise identity of the liquid vehicle selected will depend upon its suitability for use with the particular binder, spumific agent, and other ingredients present. The vehicle preferably is inert chemically to the remaining ingredients.

Other optional ingredients which may be present in such intumescent paints include carbohydrates, such as starch, and similar materials which are not necessarily film-forming but which are carbonaceous and serve to enhance the effect of the spumific agent, such as a polyhydroxy alcohol, e.g., pentaerythritol, sorbitol, mannitol, dipentaerythritol, tripentaerythritol, and other similar saturated open-chain polyhydroxy alcohols containing from five to fifteen carbon atoms and from 4 to 8 hydroxyl groups. Plasticizers for the film-forming binder may also be present in order to increase the film-forming tendencies and to soften the resultant film.

Pigments, fillers, dyes, stabilizers and other conventional paint ingredients may also be present as desired, subject to the limitation that excessive quantities of pigments or fillers tend to cancel out the desirable effects of the glass fibers. Surface active agents or wetting agents may also be present, particularly when the vehicle is water, in order to promote dispersing of the remaining ingredients in the vehicle. Chlorinated organic materials which decompose to liberate hydrogen chloride when heated to temperatures of the order of 125° to 400° C. or even higher may also be present, as for example chlorinated bi- or tri-phenyl or chlorinated paraffin waxes. Chlorine-containing binders, when present, may decompose in the same fashion. A non-film-forming aldehyde resin in finely divided particulate form, such as urea-formaldehyde or melamine-formaldehyde resins, which is insoluble in the vehicle and in the other ingredients present, may also be present.

The relative proportions of the ingredients present in addition to the inorganic fibrous material in the intumescent paints of the present invention may vary over a wide range. Best results are generally obtained when the proportions in parts by weight are within the following ranges:

Film-forming material or binder _____ 35 to 150
Spumific _____ 120 to 475

Carbonaceous materials, whether or not they are film-forming, when present in addition to other film-forming materials, are preferably present in the range from 40 to 250 parts by weight, while chlorinated material (non-film-forming) when present in addition to other film-forming materials is preferably in the range from 70 to 220 parts by weight. The amount of liquid vehicle or carrier may vary over a wide range depending upon the desired mode of application of the paint, the nature of the surface or substrate to which it is to be applied, and the nature and quantity of any optional ingredients which are present. The finely divided non-film-forming aldehyde resin, when present, may be used in the same range of proportions as the carbonaceous material.

The several ingredients are normally dissolved or dispersed in the volatile liquid vehicle or carrier, to provide a liquid paint or coating composition which is adapted to be spread or applied to the surface of the substrate to be protected in any conventional manner, as by brushing, roller applying, spraying, etc. The relative proportions of solid ingredients and liquid vehicle or carrier employed will be largely a matter of choice and will depend at least in part upon the mode of application of the composition to the substrate.

The following specific examples are intended to illustrate the nature of the invention but are not intended as a limitation upon its scope.

Example 1

To 191 parts by weight of a solvent mixture containing 50 parts butyl lactate, 50 parts toluol, 30 parts isopropanol, 6 parts diisobutyl ketone, and 55 parts high-flash naphtha, there were added 37.5 parts by weight of nitrocellulose as a film-forming binder, 37.5 parts of a mixed plasticizer for the binder containing 22 parts of tricresyl phosphate and 17.5 parts of triethyl citrate, 59.5 parts of a chlorinated material containing 30 parts of chlorinated biphenyl (Aroclor 1254) 14.5 parts of chlorinated polypropylene, and 15 parts of polyvinyl chloride. There were also stirred into the mixture 62.5 parts of pentaerythritol as the carbonaceous ingredient, 62.5 parts of a preformed particulate urea-melamine-formaldehyde resin, and 250 parts of a spumific agent consisting of melamine pyrophosphate.

Into four parts by weight of the foregoing composition was mixed one part of glass fibers precoated with polyvinyl chloride, the fibers being approximately 0.1 to 1.0 inch in length (Fiberglas screen yarn).

The foregoing composition was applied by spraying through conventional spray gun equipment (of the type used to undercoat automobile bodies) to a steel I-beam at the rate of one pound of the composition for each five pound weight of I-beam (one-half pound per square foot of I-beam surface) and allowed to dry at room temperature for one week. The beam was then subjected to a high temperature test in accordance with ASTM procedure E–119–58 (Sec. 18–22). The temperature of the furnace increased slowly from 1000° F. at the end of the first five minutes to over 1800° F. at 100 minutes. The average temperature at three locations within the beam during this period increased from about 65° F. to less than 980° F. at 100 minutes.

The exposed face of the metal treated in accordance with the present invention exhibited a blackened, charred, or carbonized appearance with the characteristic puff which results from intumescence.

Similarly, wood, fabric, and other combustible materials, as well as synthetic plastic compositions, coated or impregnated with the foregoing composition and allowed to dry exhibited remarkable resistance to heat and to burning.

Example 2

A composition was prepared in accordance with the following recipe, in which the parts are by weight, by mixing the several ingredients:

| | Parts |
|---|---|
| Hydroxyethyl cellulose | 250 |
| Aromatic hydrocarbon solvent (Amsco D) | 1560 |
| Isopropanol | 100 |
| High-flash naphtha | 400 |
| Tricresyl phosphate | 150 |

To 1300 parts by weight of this mixture there were added with stirring 200 parts by weight of titanium dioxide, 150 parts by weight of pentaerythritol, 150 parts by weight of urea-melamine-formaldehyde resin, and 600 parts by weight of melamine pyrophosphate. While substantial protection against high temperatures was found to be provided by applying this composition when applied to a steel I-beam by spraying as described in Example 1 above, superior results were obtained by mixing with 4 parts by weight of this composition one part of glass fibers precoated with polyvinyl chloride, the fibers being approximately 0.1 inch in length.

Similar results were obtained when the hydroxyethyl cellulose was replaced with an approximately equal amount by weight of nitrocellulose or of ethylhydroxyethyl cellulose. Satisfactory results were also obtainable using ethyl cellulose or cellulose acetate in place of hydroxyethyl cellulose. In compositions in which precoated glass fibers or a mixture of precoated glass fibers and asbestos fibers are employed, it is preferred to introduce also a chlorinated material such as the mixture of chlorinated biphenyl, chlorinated polypropylene, and polyvinyl chloride described in Example 1 above.

*Example 3*

A composition was prepared by mixing the following composition, in which the parts are by weight:

| | Parts |
|---|---|
| Formaldehyde | 12 |
| Monoammonium phosphate | 67 |
| Urea | 15 |
| Starch | 8 |
| Water. | |

To the foregoing composition were added 1 part of titanium dioxide pigment, and 0.25 part of gum tragacanth thickening agent. With 96 parts by weight of the foregoing composition was mixed, in a dough mixer, 2 parts of bulk glass fibers having a fiber diameter of 3 to 5 microns (Superglas 1500). The resultant paint when applied and tested as in Example 1, produced excellent results. Similar results are obtained when paraformaldehyde or hexamethylenetetramine are substituted for the formaldehyde, and when dicyandiamide or melamine are substituted for the urea.

*Example 4*

The following composition was prepared, in which the parts are by weight:

| | Parts |
|---|---|
| Chlorinated rubber | 15 |
| Aromatic hydrocarbon solvent (Amsco D) | 85 |
| Dipentaerythritol | 9 |
| Melamine pyrophosphate | 30 |

To 96 parts by weight of the foregoing composition were added in a dough mixer 9 parts of the glass fiber of Example 3. The resulting paint, when applied and tested as described in Example 1, provided excellent results. Similar results were obtained when a vinyl chloride: vinyl acetate copolymer (95:5) was substituted for the chlorinated rubber.

*Example 5*

The following composition was prepared, in which the parts are by weight:

| | Parts |
|---|---|
| Aqueous dispersion containing 60% by weight of a vinyl chloride:vinylidene chloride copolymer (75:25) | 40 |
| Monoammonium phosphate | 56 |
| Dicyandiamide | 10 |
| Pentaerythritol | 22 |
| Titanium dioxide | 12 |
| Triethylene glycol plasticizer | 5 |
| Wetting agent | 1.25 |
| Water | 47 |

To 96 parts by weight of the foregoing composition were added in a dough mixer 4 parts of the glass fibers of Example 3, 2 parts of the precoated glass fibers (50% glass by weight) of Example 1, and 3 parts of asbestos fibers. The resulting paint, when applied and tested as described in Example 1 provided excellent heat protection.

*Example 6*

The following composition was prepared in which the parts are by weight:

| | Parts |
|---|---|
| Aqueous solution containing 50% by weight of urea-formaldehyde condensation product | 35.2 |
| Tripentaerythritol | 12.0 |
| Polyphosphorylamide | 7.1 |
| Wool flock | 2.8 |
| N-ethyl p-toluene sulfonamide (plasticizer) | 7.0 |
| Titanium dioxide | 3.5 |
| Water | 32.4 |

To 96 parts by weight of the composition were added 20 parts of the bulk glass fibers of Example 1. The resulting paint, applied and tested as described in Example 1, provided excellent results.

*Example 7*

The following composition was prepared in which the parts are by weight:

| | Parts |
|---|---|
| Gloss oil | 80 |
| Dehydrated castor oil | 25 |
| Titanium dioxide pigment | 20 |
| Thinner | 115 |
| Cobalt drier | 1 |
| Linseed oil fatty acids | 15 |

Into 100 parts by weight of the foregoing composition was dispersed 100 parts by weight of the following mixture:

| | Parts |
|---|---|
| Urea formaldehyde resin | 27 |
| Starch | 8 |
| Monoammonium phosphate | 67 |

There were mixed into 90 parts by weight of the foregoing 10 parts of superglas 1000 and 10 parts of vinyl resin coated glass fibers (Fiberglas screen yarn).

When the mix was applied to a ten-inch steel beam to provide a coating 3/16" thick and tested in accordance with ASTM procedure E-119-58, the fire endurance was one hour fourteen minutes, much greater than provided by same composition without the glass fibers.

*Example 8*

With 24 parts by weight of the paint described in the first paragraph of Example 1 above, there was mixed five parts by weight of glass fibers precoated with polyvinyl chloride, the fibers being approximately 0.1 to 1.0 inch in length (Fiberglas screen yarn) and two parts by weight of asbestos fibers. The weight of glass fibers exclusive of the coating amounted to 50% of the total weight of the coated fibers, so that the asbestos amounted to 80% of the weight of the bare glass. The resulting paint, when applied and tested as described in Example 1, provided excellent results.

The compositions of the foregoing examples containing glass fibrous material also displayed markedly superior properties when tested in accordance with Federal Specification SS-A-118b.

Although specific embodiments of the present invention have been described herein, it is not intended to limit the invention solely thereto, but to include all of the obvious variations and modifications within the spirit and scope of the appended claims.

What is claimed is:

1. In an intumescent paint consisting essentially of a volatile liquid vehicle, 35 to 150 parts by weight of a resinous film-forming binder, 120 to 475 parts by weight of a solid spumific agent which when heated to 400° C. causes a dried film of the paint to increase in thickness at least four times, in combination, glass fibers in an amount from 2% to 30% by weight (exclusive of the weight of any organic coating on said fibers) based on the remaining ingredients of said paint.

2. An intumescent paint as claimed in claim 1 in which said binder is a member of the class consisting of drying oils, alkyd resins, cellulose esters, cellulose ethers, sodium carboxymethyl cellulose, starch, chlorinated rubber, rubber hydrochloride, polymers and copolymers of vinyl chloride, polymers and copolymers of vinylidene chloride, polychloroprene, epoxy resins, a mixture of urea with a source of aliphatic aldehyde, a mixture of thiourea with a source of aliphatic aldehyde, a mixture of dicyandiamide with a source of aliphatic aldehyde, a mixture of melamine with a source of aliphatic aldehyde, and resins formed from said mixtures; and in which said spumific agent is a member of the class consisting of dicyandiamide, melamine pyrophosphate, monoammonium phosphate, diammonium phosphate, phosphoric acid, guanyl urea phosphate, ammonium sulfate, sulfamic acid, ammonium sulfamate, ammonium bromide, sodium tungstate, boric acid, sodium borate, phosphorylamide polyphosphorylamide, and metaphosphates of sodium, potassium calcium, and zinc.

3. An intumescent paint as claimed in claim 1 in which there is present additionally 40 to 250 parts by weight of carbonaceous material selected from the class consisting of starch and saturated open-chain polyhydroxy alcohols containing from five to fifteen carbon atoms and from 4 to 8 hydroxyl groups.

4. An intumescent paint as claimed in claim 1 in which said glass fiber amounts to 30% to 40% by weight of the remaining solids content of said paint.

5. An intumescent paint as claimed in claim 2 in which sail glass fibers are present in an amount from 8 to 25% by weight (exclusive of the weight of any organic coating on said fibers) based on the weight of the remaining ingredients of said paint.

6. An intumescent paint as claimed in claim 2 in which said glass fibers are precoated with polyvinyl chloride.

7. An intumescent paint as claimed in claim 5 in which there is present additionally 40 to 250 parts by weight of starch.

8. An intumescent paint as claimed in claim 5 in which there is present additionally 40 to 250 parts by weight of pentaerythritol.

9. An intumescent paint as claimed in claim 5 in which there is present additionally 40 to 250 parts by weight of dipentaerythritol.

10. An intumescent paint as claimed in claim 5 in which said spumific agent is melamine pyrophosphate.

11. An intumescent paint as claimed in claim 5 in which said spumific agent is dicyandiamide.

12. An intumescent paint as claimed in claim 5 in which said spumific agent is polyphosphorylamide.

13. An intumescent paint as claimed in claim 5 in which there is present additionally asbestos fibers in an amount up to 80% by weight of the glass fibers present (exclusive of the weight of any organic coating on said fibers).

14. An intumescent paint as claimed in claim 10 in which there is present additionally 40 to 250 parts by weight of carbonaceous material selected from the class consisting of starch and saturated open-chain polyhydroxy alcohols containing from five to fifteen carbon atoms and from 4 to 8 hydroxyl groups.

References Cited by the Examiner

UNITED STATES PATENTS

| | | | |
|---|---|---|---|
| 2,418,525 | 4/1947 | Pollack. | |
| 2,428,282 | 9/1947 | Kemmler | 106—18 |
| 2,702,283 | 2/1955 | Wilson et al. | 260—6 |
| 2,956,037 | 10/1960 | Venable | 260—30.6 |
| 3,090,764 | 5/1963 | Ellis et al. | 106—16 |

FOREIGN PATENTS 596,687    4/1960    Canada.

ALEXANDER H. BRODMERKEL, *Primary Examiner.*

L. S. HAYES, *Assistant Examiner.*